(12) United States Patent
Song et al.

(10) Patent No.: US 8,059,329 B2
(45) Date of Patent: Nov. 15, 2011

(54) DISPLAY SUBSTRATE AND METHOD OF MANUFACTURING THE SAME

(75) Inventors: Keun-Kyu Song, Yongin-si (KR); Ju-Han Bae, Suwon-si (KR); Seong-Sik Shin, Seongnam-si (KR); Bo-Sung Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 671 days.

(21) Appl. No.: 11/867,215

(22) Filed: Oct. 4, 2007

(65) Prior Publication Data
US 2008/0084603 A1   Apr. 10, 2008

(30) Foreign Application Priority Data

Oct. 4, 2006 (KR) .................. 10-2006-0097500
Dec. 5, 2006 (KR) .................. 10-2006-0121945

(51) Int. Cl.
*G02B 26/00* (2006.01)
*G09G 3/34* (2006.01)

(52) U.S. Cl. ........ 359/296; 359/224; 359/290; 359/291; 359/292; 359/295; 359/298; 345/55; 345/58; 345/84; 345/107

(58) Field of Classification Search .................... 345/55, 345/58, 84–107 M, 214; 359/223, 224, 290–292, 359/295, 296, 298
See application file for complete search history.

(56) References Cited

U.S. PATENT DOCUMENTS

| 2006/0044296 A1* | 3/2006 | Murade ...................... 345/204 |
| 2006/0215071 A1* | 9/2006 | Shin et al. .................... 349/44 |

FOREIGN PATENT DOCUMENTS

| JP | 2001264823 | 9/2001 |
| KR | 1020040042798 | 5/2004 |
| KR | 1020050112878 | 12/2005 |
| KR | 1020050114129 | 12/2005 |

* cited by examiner

*Primary Examiner* — Evelyn A. Lester
(74) *Attorney, Agent, or Firm* — Cantor Colburn LLP

(57) ABSTRACT

A display substrate includes an insulation substrate, a gate line formed on the insulation substrate, a data line formed on the insulation substrate and crossing the gate line, a switching element formed on the insulation substrate and electrically connected to the gate line and the data line, and a pixel electrode formed on the insulation substrate. The pixel electrode is electrically connected to the switching element and includes a reflective electrode layer which reflects light and an absorption electrode layer which absorbs light.

15 Claims, 10 Drawing Sheets

DISPLAY SUBSTRATE AND METHOD OF MANUFACTURING THE SAME

This application claims priority to Korean Patent Application No. 2006-97500, filed on Oct. 4, 2006, and Korean Patent Application No. 2006-121945, filed on Dec. 5, 2006, and all the benefits accruing therefrom under 35 U.S.C. §119, the contents of which in their entireties are herein incorporated by reference.

BACKGROUND OF THE INVENTION

1. Field of the Invention

The present invention relates to an electrophoretic display device. More particularly, the present invention relates to a display substrate and a method of manufacturing the display substrate.

2. Description of the Related Art

An electrophoretic display device is a type of flat display device which may be used for an electronic book or other similar device. Generally, the electrophoretic display device includes a first substrate having a first electrode, a second substrate having a second electrode and a microcapsule having a white pigment particle and a black pigment particle. The microcapsule is interposed between the first and second substrates. Either the white or the black pigment particle is positively charged, and the other pigment particle is negatively charged.

A predetermined voltage is applied to the first and second electrodes to generate an electric field. As a result, the white and black pigment particles move toward the electrode having an opposite polarity in comparison to the respective moving pigment particle.

The electrophoretic display device has a high reflectivity and a high contrast ratio compared to a liquid crystal display device, and a viewing angle of the electrophoretic display device is not limited, similar to when viewing a sheet of paper, for example. Furthermore, the electrophoretic display device has a bistable characteristic. Thus, the electrophoretic display device may maintain display of an image, even when the electrophoretic display device does not continuously receive a voltage. Therefore, power consumption is reduced as compared to devices which do not have the bistable characteristic.

However, the electrophoretic display device does not have a black matrix which blocks an outside light and covers a remaining region which is not covered by the electrodes.

Furthermore, when the electrophoretic display device has a plurality of the microcapsules, an individual microcapsule is connected to an adjacent individual microcapsule by a binder. Light may leak through the binder, reducing a contrast ratio of the electrophoretic display device. A method of reducing a size of the microcapsule to reduce a space through which the light leaks has been suggested to solve the above-mentioned problem, but the suggested method may cause collisions between adjacent individual microcapsules of the plurality of microcapsules.

BRIEF SUMMARY OF THE INVENTION

The present invention provides a display substrate capable of increasing brightness and/or a contrast ratio.

The present invention also provides a method for manufacturing the display substrate.

In one exemplary embodiment of the present invention, a display substrate includes an insulation substrate, a gate line formed on the insulation substrate, a data line formed on the insulation substrate and crossing the gate line, a switching element formed on the insulation substrate and electrically connected to the gate line and the data line and a pixel electrode formed on the insulation substrate and electrically connected to the switching element. The pixel electrode includes a reflective electrode layer which reflects light and an absorption electrode layer which absorbs light.

The reflective electrode layer includes at least one selected from the group consisting of chromium and molybdenum.

The absorption electrode layer includes at least one selected from the group consisting of chromium oxide and molybdenum oxide, and an optical density of the absorption electrode layer is greater than or equal to about 3.6.

The switching element may comprise a channel having a semiconductor layer. In alternate exemplary embodiments, the switching element may include a channel having an organic semiconductor layer.

The pixel electrode may overlap the channel of the switching element.

The reflective electrode layer may be connected to the switching element and the absorption electrode layer may be formed on the reflective electrode layer.

The display substrate may further include a protection layer formed on the organic semiconductor layer. The protection layer may include an opaque organic insulation material.

The pixel electrode may further include a transparent electrode layer connected to the switching element. The reflective electrode layer may be formed on the transparent electrode layer and the absorption electrode layer may be formed on the reflective electrode layer.

In another exemplary embodiment of the present invention, a display substrate includes an insulation substrate, a gate line formed on the insulation substrate, a data line formed on the insulation substrate and crossing the gate line, a switching element formed on the insulation substrate and electrically connected to the gate line and the data line, an organic layer covering the switching element and comprising an opaque material formed on the insulation substrate and a pixel electrode. The pixel electrode is electrically connected to the switching element through a contact hole formed through the organic layer.

The organic layer may be black. In alternate exemplary embodiments, the organic layer may be white.

The display substrate may further include a passivation layer formed between the switching element and the organic layer.

In yet another exemplary embodiment of the present invention, a method of manufacturing a display substrate includes: forming a thin film transistor layer on an insulation substrate, the thin film transistor layer comprising a thin film transistor; forming a passivation layer on the thin film transistor layer; forming an opaque organic layer on the passivation layer; and forming a transparent conductive layer on the opaque organic layer.

According to the exemplary embodiments of the present invention described herein, light leakage and current leakage may be prevented and/or effectively reduced to improve display quality of an electrophoretic display device.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
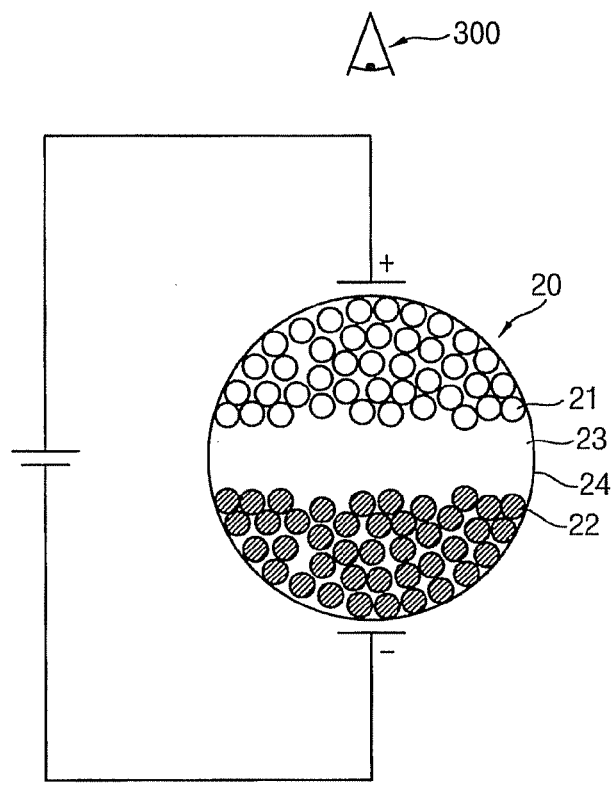
FIG. 1 is a partial schematic diagram for explaining an operation of an electrophoretic display device according to an exemplary embodiment of the present invention.

The invention is described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on" another element or layer, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof. Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Embodiments of the invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

An operation and a manufacturing process of an electrophoretic display device according to an exemplary embodiment of the present invention will now be explained more fully with reference to FIGS. 1 and 2.

FIG. 1 is a partial schematic view for explaining the operation of an electrophoretic display device according to an exemplary embodiment of the present invention. FIG. 2 is a cross-sectional view of a method of manufacturing electrophoretic display device according to an exemplary embodiment of the present invention.

Referring to FIG. 1, the electrophoretic display device includes a pixel electrode (not shown) and a common electrode (not shown) which form an electric field therebetween. A microcapsule 20 having a plurality of white pigment particles 21 and a plurality of black pigment particles 22 is disposed between the pixel electrode and the common electrode. The plurality of white pigment particles 21 and the plurality of black pigment particles 22 are dispersed in a fluid 23 and are contained in a container 24. The plurality of white pigment particles 21 may be positively charged while the plurality of black pigment particles 22 may be negatively charged, for example, but alternative exemplary embodiments are not limited thereto. Furthermore, in alternative exemplary embodiments, microcapsules may include a red pigment particle, a green pigment particle, a blue pigment particle, a cyan pigment particle, a magenta pigment particle or a yellow pigment particle, for example, but are not limited thereto.

When a voltage is applied to the pixel electrode and the common electrode to form an electric field, the plurality of white pigment particles 21 and the plurality of black pigment particles 22 move toward the corresponding pixel electrode or common electrode having an opposite polarity to the polarity of the plurality of white pigment particles 21 and the plurality of black pigment particles 22, respectively. Thus, an observer 300 observes an image including white and/or black colors.

Figure 2:
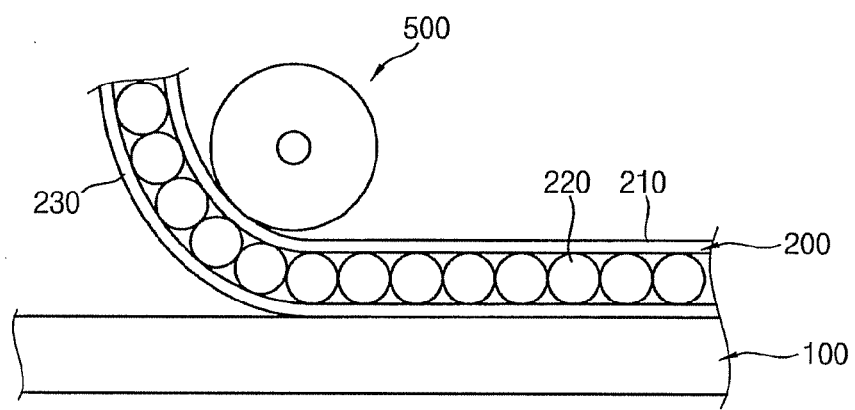
FIG. 2 is a cross-sectional view of a method of manufacturing an electrophoretic display device according to an exemplary embodiment of the present invention.

Referring to FIG. 2, the electrophoretic display device includes a display substrate 100 and an opposite substrate 200. The display substrate 100 may include a plurality of signal lines (not shown), a plurality of pixel electrodes (not shown) and a plurality of thin-film transistors ("TFTs") (not shown) electrically connecting the signal lines to the pixel electrodes. The opposite substrate 200 may include a plastic film 210 having a common electrode (not shown) and a plurality of microcapsules 220. The common electrode of the opposite substrate 200 faces the pixel electrodes of the display substrate 100, e.g., the opposite substrate 200 is oriented substantially parallel to the display substrate, as shown in FIG. 2, to form an electric field between the common electrode and the pixel electrodes.

The opposite substrate 200 is laminated on the display substrate 100 by a laminator 500, and an adhesive 230 between the display substrate 100 and the opposite substrate 200 adheres the display substrate 100 with the opposite substrate 200.

Hereinafter, a more detailed structure of an electrophoretic display device according to exemplary embodiments of the present invention will be more fully explained with reference to the accompanying drawings.

Figure 3:
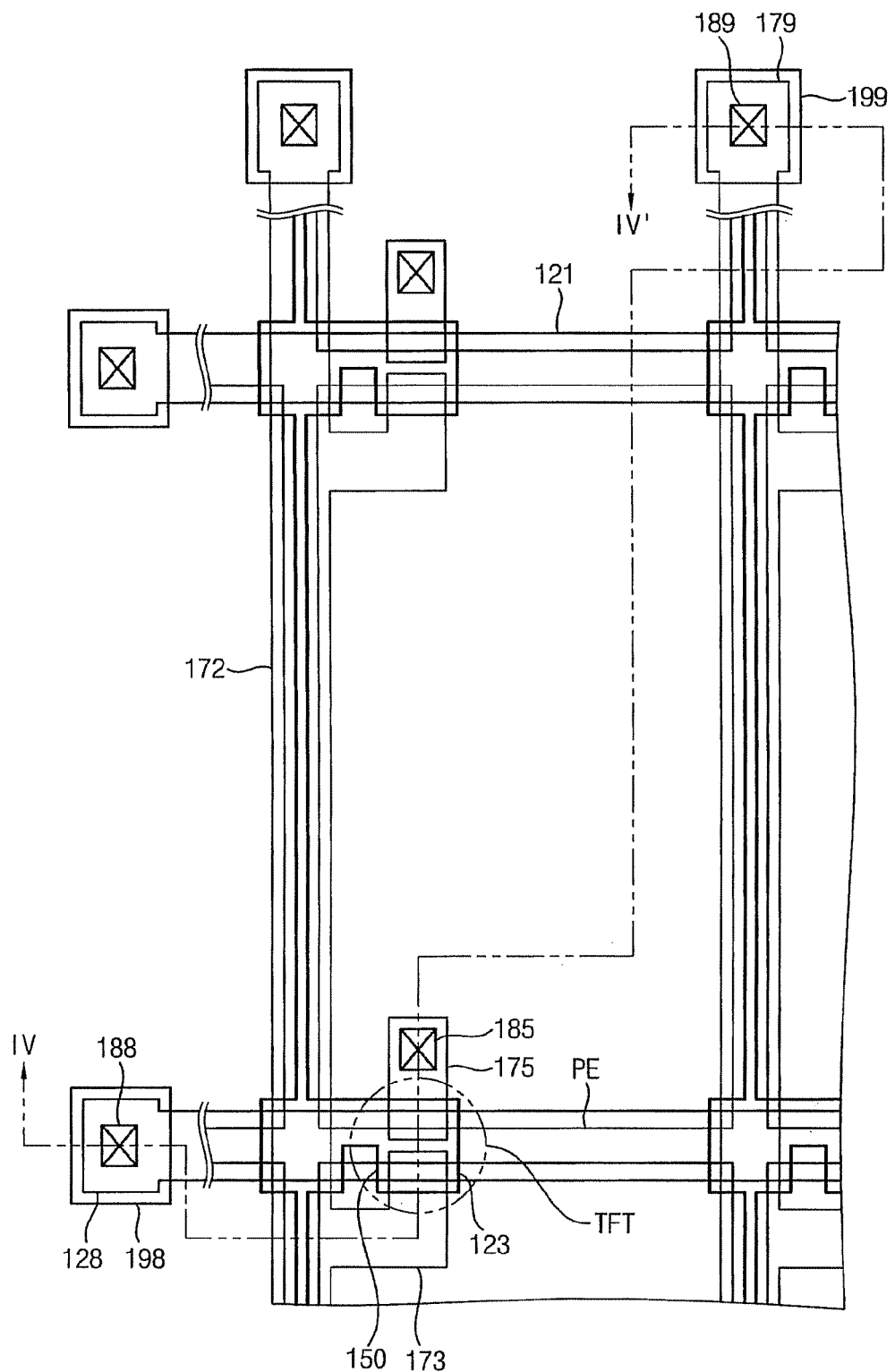
FIG. 3 is a plan view of a display substrate of an electrophoretic display device according to an exemplary embodiment of the present invention.
Figure 4:
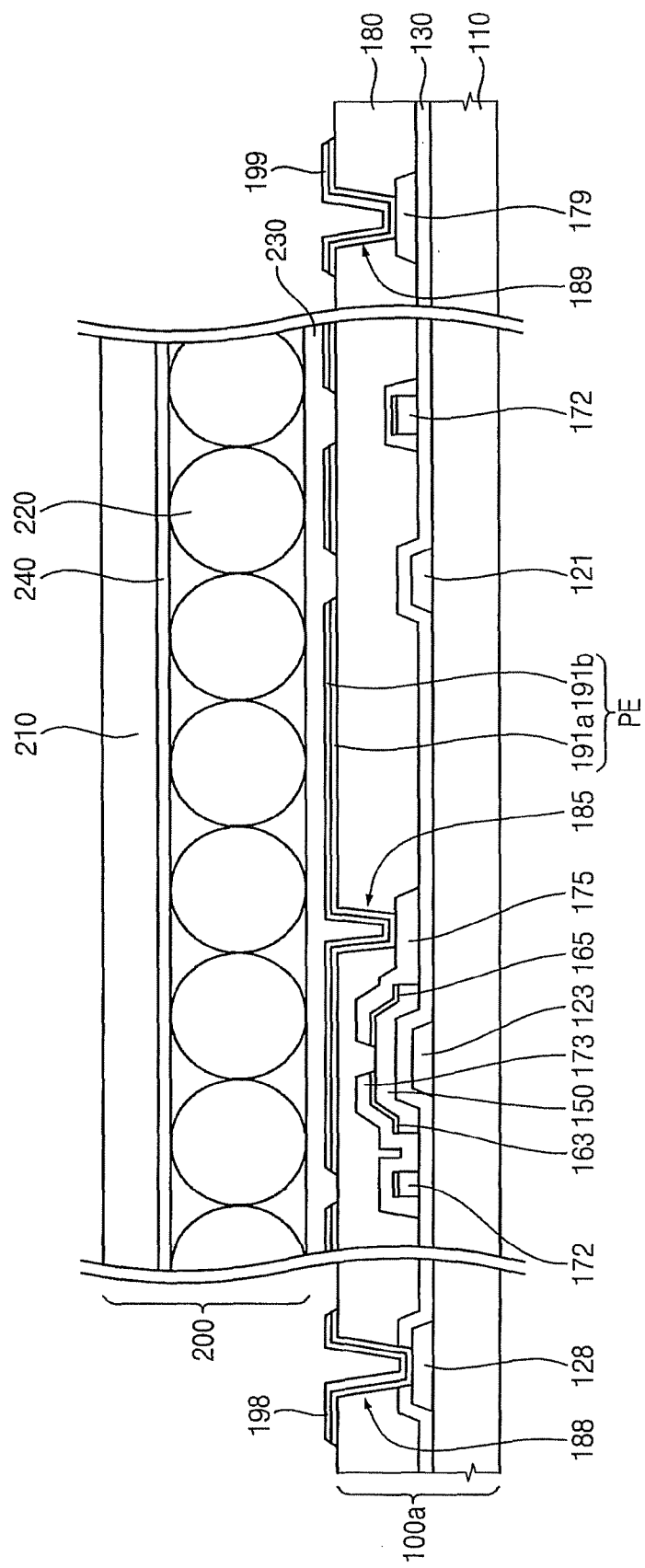
FIG. 4 is a cross-sectional view taken along line IV-IV' of FIG. 3.

FIG. 3 is a plan view of a display substrate of an electrophoretic display device according to an exemplary embodiment of the present invention. FIG. 4 is a cross-sectional view taken along line IV-IV' of FIG. 3.

Referring to FIGS. 3 and 4, an electrophoretic display device includes a display substrate 100a, an opposite substrate 200, a plurality of microcapsules 220 and an adhesive 230 adhering the display substrate 100a to the opposite substrate 200.

Referring to FIGS. 3 and 4, the display substrate 100a includes a lower insulation substrate 110 and a plurality of gate lines 121 formed on the lower insulation substrate 110. The gate lines 121 extend in a first direction. Each of the gate lines 121 may have a single layer including a material which has low resistance, such as silver, aluminum, copper, a silver alloy, a copper alloy or an aluminum alloy, for example, but is not limited thereto. Furthermore, each of the gate lines 121 may further have an additional layer including a material which has good contact characteristics, such as chromium, titanium or tantalum, for example, but is not limited thereto, to form a multilayered structure. A gate electrode 123 extends from each of the gate lines 121, as shown in FIG. 3. The gate lines 121 may be inclined relative to a surface of the lower insulation substrate 110 and an inclination angle thereof may be in a range of about 20 degrees to about 80 degrees.

A gate insulation layer 130 is formed on the gate lines 121. The gate insulation layer 130 may be made of silicone nitride, for example, but is not limited thereto.

A semiconductor layer 150 is formed on the gate insulation layer 130. The semiconductor layer 150 may be made of hydrogenated amorphous silicon, for example, but is not limited thereto. The semiconductor layer 150 overlaps the gate electrode 123 to serve as a channel of a TFT. A first ohmic contact layer 163 and a second ohmic contact layer 165 spaced apart from the first ohmic contact layer 163 are formed on the semiconductor layer 150. The first ohmic contact layer 163 and the second ohmic contact layer 165 may be made of hydrogenated amorphous silicon into which $n^+$ impurities are implanted at a high concentration, for example, but are not limited thereto. The first ohmic contact layer 163 is disposed adjacent to a side of the gate electrode 123, and the second ohmic contact layer 165 is disposed adjacent to an opposite side of the gate electrode 123, as illustrated in FIG. 4. The first ohmic contact layer 163, the second ohmic contact layer 165 and the semiconductor layer 150 may be inclined relative to the surface of the lower insulation substrate 110 and an inclination angle thereof may be in a range of about 20 degrees to about 80 degrees.

A plurality of data lines 172 and a plurality of drain electrodes 175 are formed on the gate insulation layer 130, the first ohmic contact layer 163 and the second ohmic contact layer 165. Each of the data lines 172 and the drain electrodes 175 may have a single layer including a material which has low resistance, such as silver, aluminum, a silver alloy or an aluminum alloy, for example, but is not limited thereto. Furthermore, each of the data lines 172 and the drain electrodes 175 may have an additional layer including a material which has good contact characteristics, such as chromium, titanium or tantalum, for example, but is not limited thereto, to form a multilayered structure. The data lines 172 extend in a second direction substantially perpendicular to the first direction to cross the gate lines 121, and each of the data lines 172 includes a source electrode 173 extended from each of the data lines 172. The source electrode 173 is disposed on the first ohmic contact layer 163. The drain electrode 175 is disposed on the second ohmic contact layer 165 and is spaced apart from the source electrode 173.

Each of the data lines 172 including the source electrode 173 and the drain electrodes 175 may be inclined relative to the surface of the lower insulation substrate 110 and an inclination angle thereof may be in a range of about 20 degrees to about 80 degrees.

The first ohmic contact layer 163 and the second ohmic contact layer 165 reduce a contact resistance between the semiconductor layer 150 and the source electrode 173, and between the semiconductor layer 150 and the drain electrode 175, respectively.

A protection layer 180 is formed on the lower insulation substrate 110 having the data lines 172, the source electrodes 173 and the drain electrodes 175 to cover the TFT and to planarize the lower insulation substrate 110. Examples of a material which may be used for the protection layer 180 include an acryl-based organic material, of which a dielectric constant is relatively low, but are not limited thereto.

A first contact hole 185, a second contact hole 188 and a third contact hole 189 are formed in the protection layer 180. The first contact hole 185 exposes the drain electrode 175, the second contact hole 188 exposes an end portion 128 of the gate line 121 and the third contact hole 189 exposes an end portion 179 of the data line 172. The gate line 121 is electrically connected to a gate driver (not shown) through the second contact hole 188, and the data line 172 is electrically connected to a data driver (not shown) through the third contact hole 189.

Each of the first, second and third contact holes 185, 188 and 189 may be inclined relative to the surface of the lower insulation substrate 110 and an inclination angle thereof may be more than about 30 degrees and less than about 90 degrees.

The display substrate 100a may further include a passivation layer (not shown) disposed under the protection layer 180 and covering an exposed portion of the semiconductor layer 150. Examples of a material which may be used for the passivation layer include silicon oxide and silicon nitride, but are not limited thereto.

A pixel electrode PE is formed on the protection layer 180 and the drain electrode 175. The pixel electrode PE includes a reflective electrode layer 191a and an absorption electrode layer 191b formed on the reflective electrode layer 191a.

The reflective electrode layer 191a may be made of a metal including chromium or molybdenum, for example. The reflective electrode layer 191a reflects light incident onto the pixel electrode PE from below, e.g., from a side of the pixel electrode PE closest to the protection layer 180. Thus, the light from below is prevented from leaking between the microcapsules and therefore is prevented from being perceived by the observer.

The absorption electrode layer 191b is made of an opaque material. More specifically, the absorption electrode layer 191b may be made of chromium oxide ("CrOx"), or molybdenum oxide ("MoOx"), for example. Further, the opaque material of the absorption electrode layer 191b may have an optical density of no less than about 3.6. The absorption electrode layer 191b absorbs light reflected and/or scattered by pigment particles (not shown) in the microcapsules 220. When the electrophoretic display device displays a black image, the absorption electrode layer 191b absorbs light incident from outside the electrophoretic display device, e.g., a surface of the electrophoretic display device opposite the protection layer 180 to the pixel electrode PE, to increase a contrast ratio.

The reflective electrode layer 191a and the absorption electrode layer 191b are electrically connected to the drain electrode 175 of the TFT through the first contact hole 185. The reflective electrode layer 191a and the absorption electrode layer 191b have resistances less than or equal to a resistance of a transparent conductive material, such as indium tin oxide ("ITO") or indium zinc oxide ("IZO"), for example, but not being limited thereto. Thus, the reflective electrode layer 191a and the absorption electrode layer 191b may serve as an electrode which receives a predetermined voltage to control charged pigment particles (not shown) in the microcapsules 220.

The pixel electrode PE may extend to overlap the channel of the TFT to prevent light leakage from being irradiated onto the channel of the TFT.

Thus, the electrophoretic display device according to an exemplary embodiment of the present invention effectively prevents and/or reduces a leakage current due to leakage light irradiated onto the channel of the TFT, even if the electrophoretic display device does not have a black matrix.

In one exemplary embodiment, the pixel electrode PE overlaps a portion of the gate line 121 and the data line 172, increasing an aperture of the electrophoretic display device. Thus, a region between the pixel electrodes PE may be reduced. Furthermore, the protection layer 180 having a relatively low dielectric constant is disposed between the pixel electrode PE and the gate line 121 and between the pixel electrode PE and the data line 172 so that a parasitic capacitance is reduced.

A first contact electrode 198 may be formed on the protection layer 180 and the end portion 128 of the gate line 121, and a second contact electrode 199 may be formed on the protection layer 180 and the end portion 179 of the data line 172. The first contact electrode 198 is electrically connected to the end portion 128 of the gate line 121 through the second contact hole 188, and the second contact electrode 199 is electrically connected to the end portion 179 of the data line 172 through the third contact hole 189. The first contact electrode 198 and the second contact electrode 199 protect the end portion 128 of the gate line 121 and the end portion 179 of the data line 172 and may reinforce adhesion between the display substrate 100a and the gate driver (not shown) and the data driver (not shown). The first contact electrode 198 and the second contact electrode 199 may be formed from substantially the same layers as the pixel electrode PE, e.g., the reflective electrode layer 191a and the absorption electrode layer 191b formed on the reflective electrode layer 191a, as shown in FIG. 4.

The opposite substrate 200 faces, e.g., is arranged substantially parallel to, the display substrate 100a and includes an upper insulation substrate 210 and a common electrode 240. The common electrode 240 may include a transparent conductive material, such as ITO or IZO, for example, but is not limited thereto. The common electrode 240 faces the pixel electrode PE and generates an electric field with the pixel electrode PE to move the charged pigment particles (not shown) in the microcapsules 220.

Figure 5:
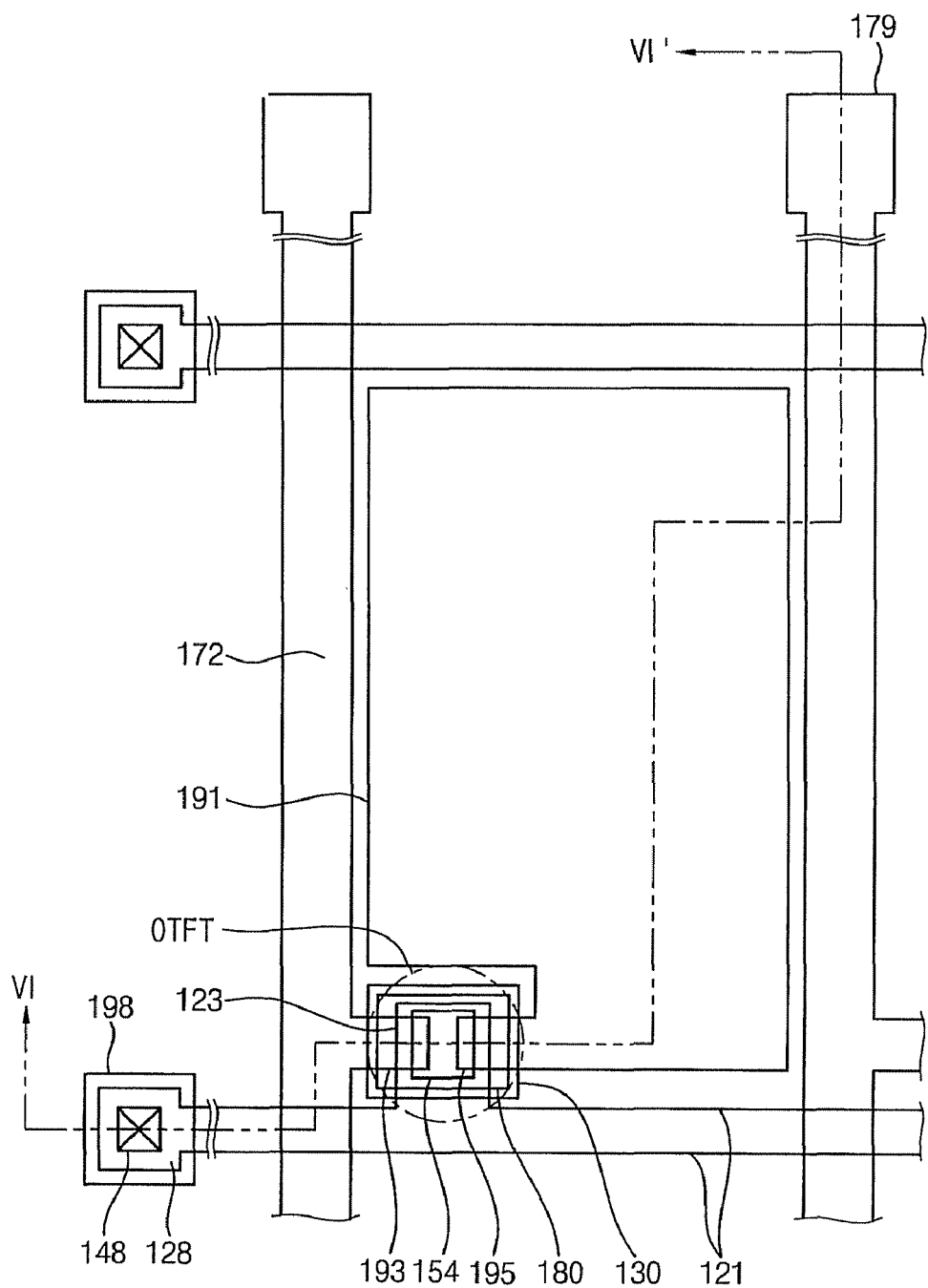
FIG. 5 is a plan view of a display substrate of an electrophoretic display device according to another exemplary embodiment of the present invention.
Figure 6:
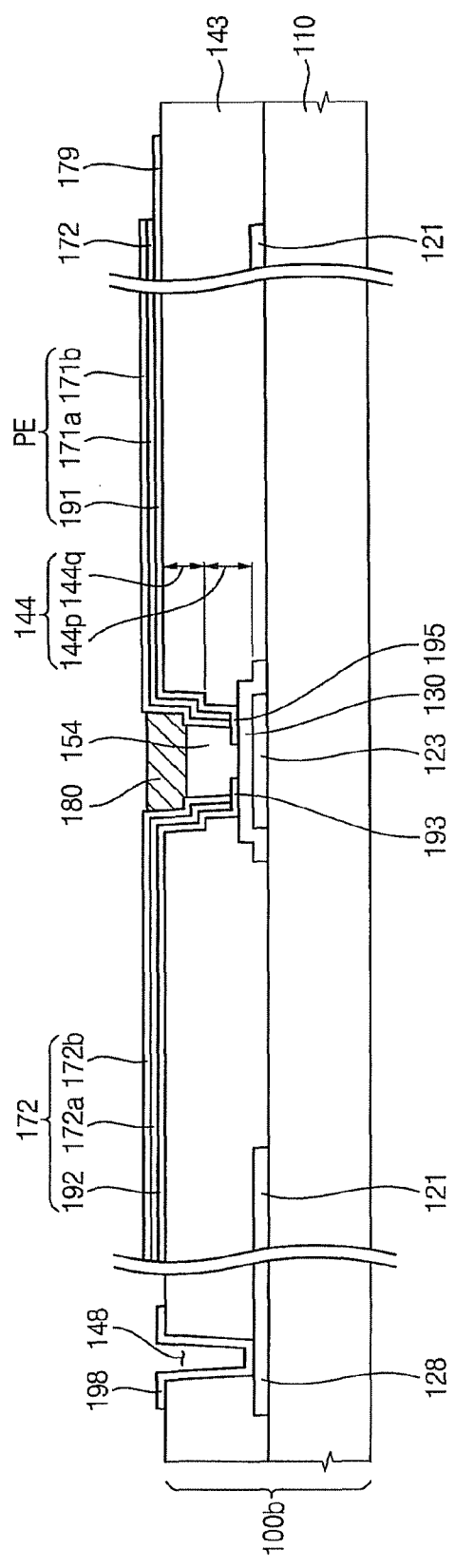
FIG. 6 is a cross-sectional view taken along line VI-VI' of FIG. 5.

FIG. 5 is a plan view of a display substrate of an electrophoretic display device according to another exemplary embodiment of the present invention. FIG. 6 is a cross-sectional view taken along line VI-VI' of FIG. 5.

Referring to FIGS. 5 and 6, a display substrate 100b includes an insulation substrate 110 and a plurality of gate lines 121 formed on the insulation substrate 110. Examples of a material which may be used for the insulation substrate 110 may include a transparent glass, silicone or plastic, but are not limited thereto.

The gate lines 121 extend in a first direction. Each of the gate lines 121 includes a gate electrode 123 protruding from the gate lines 121 and an end portion 128 electrically connected to a gate driver (not shown). The gate electrode 123 receives a gate signal through the gate line 121. A width, extending in the second direction, of the end portion 128 may be greater than a width, also extending in the second direction, of the gate line 121.

An insulation layer 143 is formed on the insulation substrate 110 having the gate lines 121. The insulation layer 143 may be formed using a photosensitive organic material, for example, but is not limited thereto. A thickness of the insulation layer 143 may be in a range of about 0.5 μm to about 4 μm.

The insulation layer 143 has an opening 144 and a contact hole 148. The opening 144 includes a lower opening 144p and an upper opening 144q disposed above the lower opening 144p. A width of the upper opening 144q is larger than a width of the lower opening 144p to form a step shape, as illustrated in FIG. 6. The contact hole 148 exposes the end portion 128 of the gate line 121.

A gate insulation layer 130 is formed in the upper opening 144p. The insulation layer 143 adjacent to the upper opening 144p may serve as a bank surrounding the gate insulation layer 130.

An organic material or an inorganic material may be used for the gate insulation layer 130. Examples of the organic material may include polyimide, polyvinyl alcohol, a fluorine-containing compound and parylene, but are not limited thereto. Examples of the inorganic material may include silicon oxide treated with octadecyltrichlorosilane ("OTS"), but are not limited thereto.

A data line 172, a pixel electrode PE and a contact electrode 198 are formed on the insulation layer 143.

The data line 172 extends in a second direction substantially perpendicular to the first direction to cross the gate line 121. The data line 172 includes a source electrode 193 protruding from the data line 172 and an end portion 179 electrically connected to a data driver (not shown). The source electrode 193 receives a data signal from the data line 172. A width, extending in the first direction, of the end portion 179 maybe greater than a width, also extending in the first direction, of the data line 172.

The pixel electrode PE and the data line 172 may include a plurality of sequentially deposited layers. More specifically, the pixel electrode PE includes a first transparent conductive layer 191, a first reflective electrode layer 171a and a first absorption electrode layer 171b. The data line 172 includes a second transparent conductive layer 192, a second reflective electrode layer 172a and a second absorption electrode layer 172b. Examples of a material which may be used for the first transparent conductive layer 191 and the second transparent conductive layer 192 may include a transparent conductive material, such as ITO or IZO, but are not limited thereto. Examples of a material which may be used for the first reflective electrode layer 171a and the second reflective electrode layer 172a may include a metal having a relatively high reflectivity, but are not limited thereto. Examples of a material which may be used for the first absorption electrode layer 171b and the second absorption electrode layer 172b may include an opaque material, but are not limited thereto.

The source electrode 193 and the end portion 179 of the data line 172 have a single layer including a transparent conductive material. In alternative exemplary embodiments, the end portion 179 of the data line 172 may have a multilayered structure substantially the same as the data line 172.

The reflective metal which may be used for the first reflective electrode layer 171a and the second reflective electrode layer 172a may include molybdenum, a molybdenum alloy, chromium, a chromium alloy, aluminum, an aluminum alloy, copper, a copper alloy, silver or a silver alloy, for example, but is not limited thereto. In alternative exemplary embodiments, chromium and/or molybdenum may be used for the first reflective electrode layer 171a and the second reflective electrode layer 172a, for example, but is not limited thereto. The opaque material which may be used for the first absorption electrode layer 171b and the second absorption electrode layer 172b may be black or white. Examples of the opaque material may include chromium oxide or molybdenum oxide, but are not limited thereto. Further, the opaque material may have an optical density of no less than about 3.6. Finally, in exemplary embodiments, an etching selection ratio of the transparent conductive material may be different from that of the reflective metal, and an etching selection ratio of the reflective metal may be similar to that of the opaque material, as will be described in further detail later.

A drain electrode 195 extends from the first transparent conductive layer 191 of the pixel electrode PE and overlaps the gate insulation layer 130, as shown in FIG. 6. Similarly, the source electrode 193 extends from the second transparent conductive layer 192 of the data line 172 and overlaps the gate insulation layer 130.

The pixel electrode PE receives a data voltage through the drain electrode 195. The pixel electrode PE which receives the data voltage and a common electrode (not shown) which receives a common voltage generate an electric field to move charged pigment particles (not shown) between the pixel electrode PE and the common electrode.

The first reflective electrode layer 171a of the pixel electrode PE reflects light entering into the electrophoretic display device from below e.g., from a side of the pixel electrode PE closest to the insulation layer 143. Thus, the light may be effectively prevented or reduced from leaking between microcapsules and being perceived by an observer. Further, when the electrophoretic display device displays a black image, the absorption electrode layer 171b of the pixel electrode PE absorbs light from outside the electrophoretic display device, e.g., from a side of the electrophoretic display device opposite the insulation layer 143 to the pixel electrode PE to increase a contrast ratio of the electrophoretic display device.

The contact electrode 198 is electrically connected to the end portion 128 of the gate line 121 through the contact hole 148. The contact electrode 198 reinforces adhesion between the end portion 128 of the gate line 121 and the gate driver (not shown) and protects the end portion 128 of the gate line 121.

An organic semiconductor layer 154 is formed in the opening 144. The organic semiconductor layer 154 makes contact with the source electrode 193 and the drain electrode 195 and overlaps a portion of the gate electrode 123.

The organic semiconductor layer 154 may include a polymer and/or a low molecular weight compound, which is soluble in an aqueous solution or an organic solvent. More specifically, the organic semiconductor layer 154 may be made of tetracene, pentacene or a derivative substituted therefore, for example, but is not limited thereto. Furthermore and even more specifically, the organic semiconductor layer 154 may include oligothiophene having 4 to 8 thiophene rings which are connected to each other through a first carbon and a fourth carbon of a thiophene ring, for example, such as polythienylene vinylene, poly-3-hexylthiophene, polythiophene, phthalocyanine, metallized phthalocyanine, a halogenated derivative thereof, perylenetetracarboxylic dianhydride ("PTCDA"), naphthalenetetracarboxylic dianhydride ("NTCDA"), an imide derivative thereof, perylene, coronene or a derivative substituted therefore, but not being limited thereto. These can be used alone or in a combination thereof.

A thickness of the organic semiconductor layer 154 may be in a range of about 0.03 μm to about 1 μm.

The gate electrode 123, the source electrode 193, the drain electrode 195 and the organic semiconductor layer 154 form an organic TFT ("OTFT"). The organic semiconductor layer 154 serves as a channel of the organic TFT. In alternate exemplary embodiments, an end portion of each of the source electrode 193 and the drain electrode 195 may have a curved shape (not shown) to increase a width of the channel so that current characteristics of the organic TFT may be improved.

A protection layer 180 is formed on the organic semiconductor layer 154. The protection layer 180 may include an organic insulation material and/or an inorganic insulation material which are capable of blocking light. The protection layer 180 prevents the organic semiconductor layer 154 from being damaged during a manufacturing process. The protection layer 180 further prevents light from being irradiated onto the channel to effectively prevent and/or reduce a leakage current.

Figure 7:
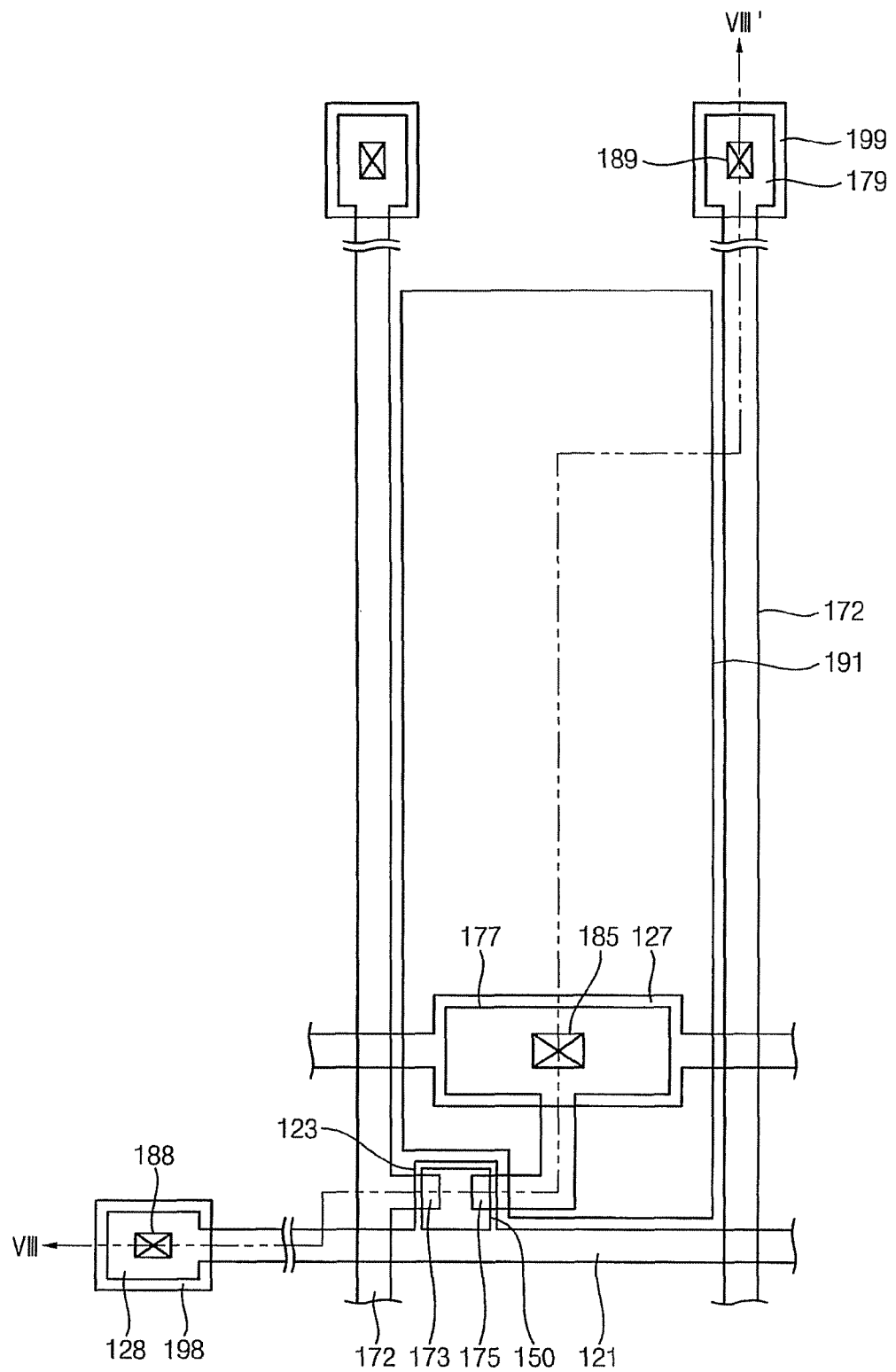
FIG. 7 is a plan view of a display substrate of an electrophoretic display device according to still another exemplary embodiment of the present invention.
Figure 8:
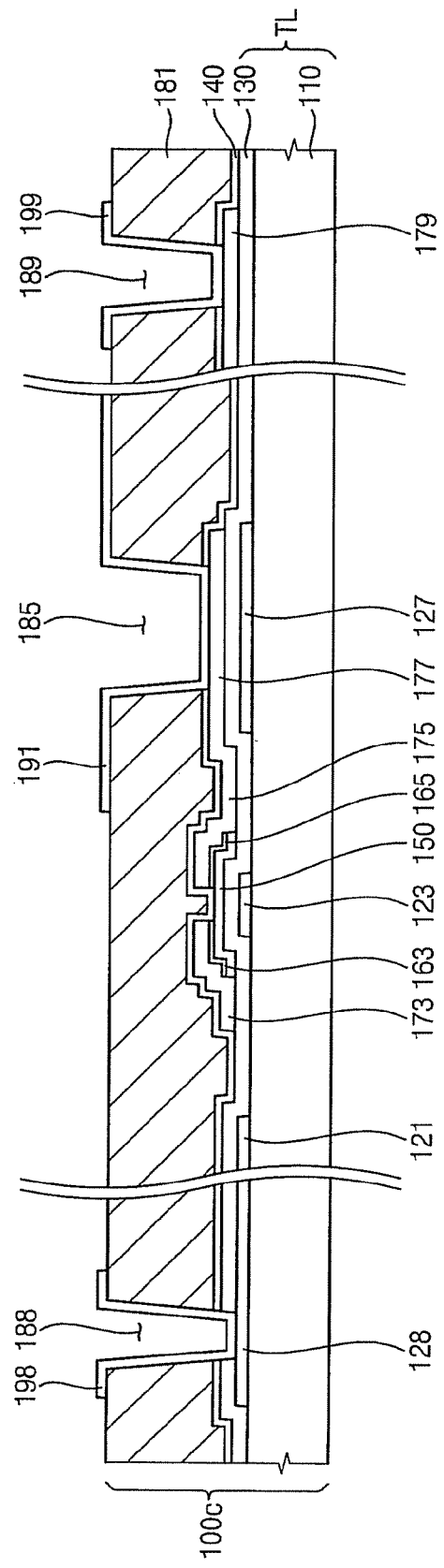
FIG. 8 is a cross-sectional view taken along line VIII-VIII' of FIG. 7.

FIG. 7 is a plan view of a display substrate of an electrophoretic display device according to still another exemplary embodiment of the present invention. FIG. 8 is a cross-sectional view taken along line VIII-VIII' of FIG. 7.

Referring to FIGS. 7 and 8, a display substrate 100c includes an insulation substrate 110 and a plurality of gate lines 121 formed on the insulation substrate 110. Examples of a material which may be used for the insulation substrate 110 may include a transparent glass, silicone or plastic, but are not limited thereto. The gate lines 121 extend in a first direction. Each of the gate lines 121 includes a gate electrode 123 protruding from the gate lines 121 and an end portion 128 electrically connected to a gate driver (not shown). The gate electrode 123 receives a gate signal from the gate line 121. A width, extending in the first direction, of the end portion 128 may be greater than a width, also extending in the first direction, of the gate line 121. A storage line 127 is formed on the insulation layer 110 and extends in the first direction, e.g., in a direction substantially parallel to the gate line 121.

Each of the gate lines 121 may have a single layer including a material, used alone or in combinations, which has low resistance, such as silver, aluminum, copper, a silver alloy, a copper alloy or an aluminum alloy, for example, but not being limited thereto. Alternatively, each of the gate lines 121 may further have an additional layer including a material which has good contact characteristics, such as chromium, titanium or tantalum, for example, but not being limited thereto, used alone or in a combination thereof, to form a multilayered structure.

A gate insulation layer 130 is formed on the gate line 121, the gate electrode 123 and the storage line 127. Examples of a material which may be used for the gate insulation layer 130 may include silicon nitride, but are not limited thereto.

A semiconductor layer 150 is formed on the gate insulation layer 130. Examples of a material which may be used for the semiconductor layer 150 may include hydrogenated amorphous silicon, but are not limited thereto. As shown in FIG. 8, the semiconductor layer 150 overlaps the gate electrode 123 to serve as a channel of a TFT (not labeled). A first ohmic contact layer 163 and a second ohmic contact layer 165 spaced apart from the first ohmic contact layer 163 are formed on the semiconductor layer 150. Examples of a material which may be used for the first and second ohmic contact layers 163 and 165 may include hydrogenated amorphous silicon into which n+ impurities are implanted at a high concentration, but are not limited thereto. The first ohmic contact layer 163 is disposed adjacent to a side of the gate electrode 123, and the second ohmic contact layer 165 is disposed adjacent to an opposite side of the gate electrode 123, as shown in FIG. 8.

A plurality of data lines 172 and a plurality of drain electrodes 175 are formed on the gate insulation layer 130, the first ohmic contact layer 163 and the second ohmic contact layer 165. Each of the data lines 172 and the drain electrodes 175 may have a single layer including a material which has low resistance, such as silver, aluminum, a silver alloy or an aluminum alloy, for example, but is not limited thereto. Furthermore, each of the data lines 172 and the drain electrodes 175 may have an additional layer including a material which has good contact characteristics, such as chromium, titanium or tantalum, for example, but is not limited thereto, to form a multilayered structure. The data lines 172 extend in a second direction substantially perpendicular to the first direction to cross the gate lines 121, and each of the data lines 172 includes a source electrode 173 extending from each of the data lines 172. The source electrode 173 is disposed on the first ohmic contact layer 163. The drain electrode 175 is disposed on the second ohmic contact layer 165 and is spaced apart from the source electrode 173. A storage electrode 177 is formed from substantially the same layer as the data line 172, and overlaps the storage line 127.

A passivation layer 140 is formed on the insulation substrate 110 having the data line 172, the source electrode 173, the drain electrode 175 and the storage electrode 177. An opaque organic layer 181 is formed on the passivation layer 140. The opaque organic layer 181 may include an organic material capable of absorbing light. The opaque organic layer 181 may be black or white, and a thickness of the opaque organic layer 181 may be about 3 μm to about 4 μm.

The opaque organic layer 181 absorbs light leaking between microcapsules of the electrophoretic display device to prevent the light from being reflected and/or scattered by the display substrate 100c. Thus, a contrast ratio of the electrophoretic display device is increased. Furthermore, the opaque organic layer 181 covers the channel of the TFT to effectively prevent and/or reduce a leakage current due to the leakage light irradiated onto the channel.

A first contact hole 185, a second contact hole 188 and a third contact hole 189 are formed through the passivation layer 140 and the opaque organic layer 181. The first contact hole 185 exposes the drain electrode 175. The second contact hole 188 exposes the end portion 128 of the gate line 121. The third contact hole 189 exposes an end portion 179 of the data line 172.

A pixel electrode 191, a first contact electrode 198 and a second contact electrode 199 are formed on the opaque organic layer 181. The pixel electrode 191 is electrically connected to the drain electrode 175 through the first contact hole 185, the first contact electrode 198 is electrically connected to the end portion 128 of the gate line 121, and the second contact electrode 199 is electrically connected to the end portion 179 of the data line 172. Examples of a material which may be used for the pixel electrode 191, the first contact electrode 198 and the second contact electrode 199 may include a transparent conductive material, such as ITO or IZO, for example, but are not limited thereto.

Figure 9A:
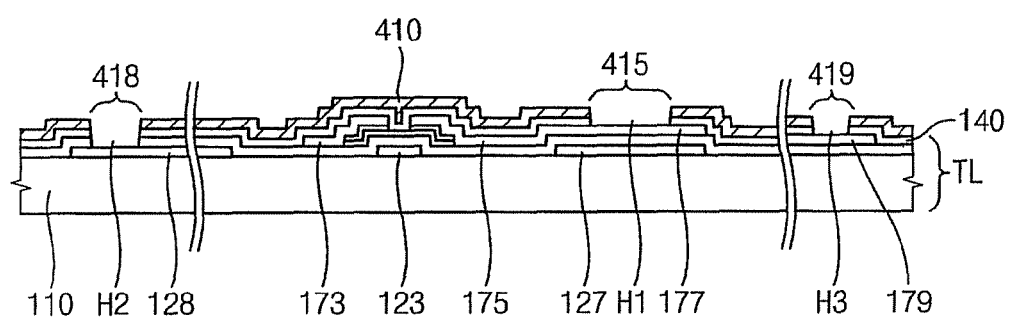
FIGS. 9A and 9B are cross-sectional views illustrating a process according to an exemplary embodiment for manufacturing the display substrate according to the exemplary embodiment of the present invention illustrated in FIG. 8.
Figure 9B:
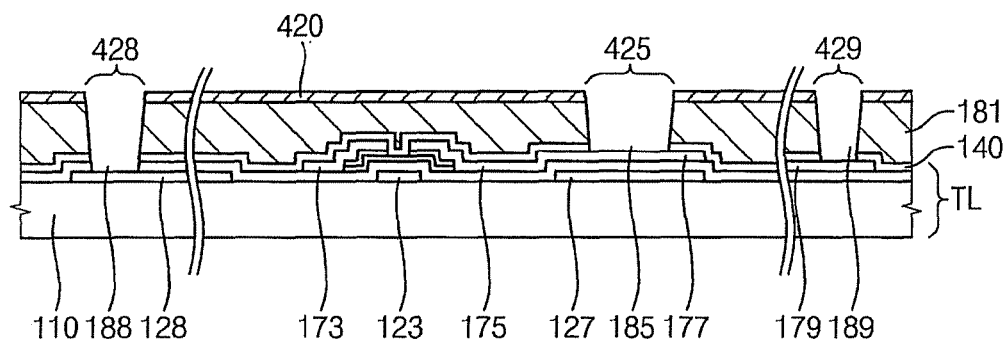

FIGS. 9A and 9B are cross-sectional views illustrating a process according to an exemplary embodiment for manufacturing the display substrate according to the exemplary embodiment of the present invention illustrated in FIG. 8. Descriptions of components of the display substrate according to the exemplary embodiment of the present invention in FIG. 8 which have already been described above will be omitted hereinafter.

Referring to FIGS. 8 and 9A, a TFT layer TL including a TFT is formed on an insulation layer 110. A passivation layer 140 is formed on the TFT layer TL. A first mask 410 is formed on the passivation layer 140. A first opening 415, a second opening 418 and a third opening 419 are formed through the first mask 410.

The passivation layer 140 is etched using the first mask 410 to form a first hole H1, a second hole H2 and a third hole H3 corresponding to the first opening 415, the second opening 418 and the third opening 419, respectively.

Referring to FIGS. 8, 9A and 9B, an opaque organic layer 181 is formed on the passivation layer 140 having the first, second and third holes H1, H2 and H3, respectively. In an exemplary embodiment, a thickness of the opaque organic layer 181 is in a range of about 0.5 μm to about 4 μm.

A second mask 420 is formed on the opaque organic layer 181. A first opening 425, a second opening 428 and a third opening 429 overlapping the first to third holes H1, H2 and H3, respectively are formed through the second mask 420. The opaque organic layer 181 is etched using the second mask 420 to form a first contact hole 185 exposing a drain electrode 175, a second contact hole 188 exposing an end portion 128 of a gate line 121 and a third contact hole 189 exposing an end portion 179 of a data line 172.

A transparent conductive layer is formed on the insulation layer 110 having the first to third contact holes 185, 188 and 189, and then patterned to form a pixel electrode 191, a first contact electrode 198 and a second contact electrode 199.

Figure 10A:
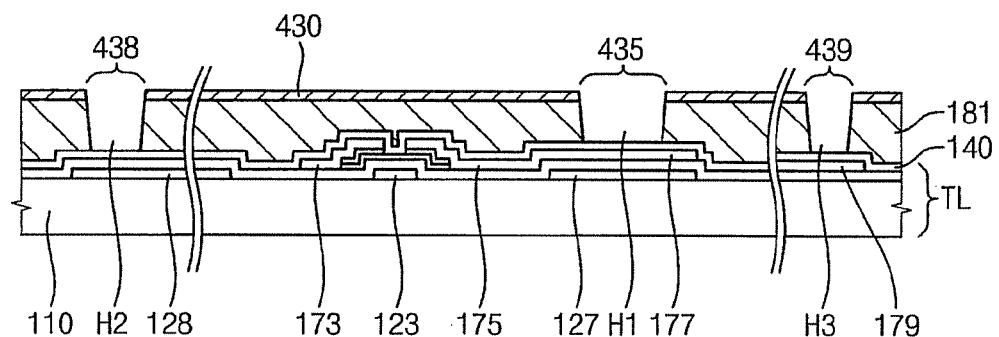
FIGS. 10A and 10B are cross-sectional views illustrating a process according to another exemplary embodiment for manufacturing the display substrate according to the exemplary embodiment of the present invention illustrated in FIG. 8.
Figure 10B:
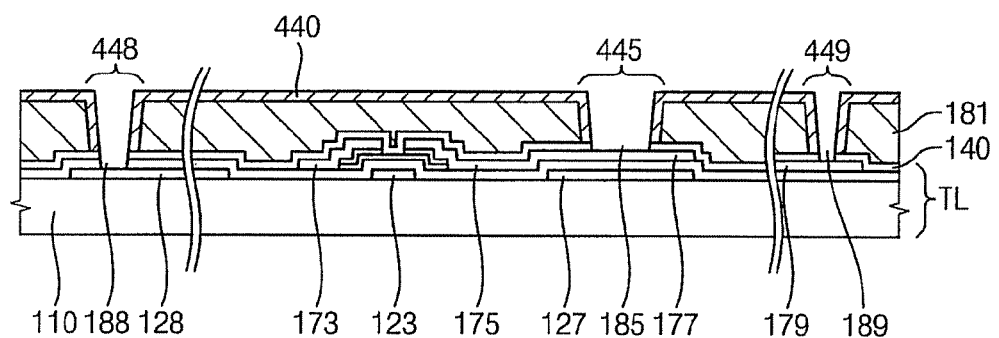

FIGS. 10A and 10B are cross-sectional views illustrating a process according to another exemplary embodiment for manufacturing the display substrate according to the exemplary embodiment of the present invention illustrated in FIG. 8.

Referring to FIGS. 8 and 10A, a TFT layer TL including a TFT is formed on an insulation layer 110. A passivation layer 140 and an opaque organic layer 181 are sequentially formed on the TFT layer TL.

A first mask 430 is formed on the opaque organic layer 181. A first opening 435, a second opening 438 and a third opening 439 are formed through the first mask 430.

The opaque organic layer 181 is etched using the first mask 430 to form a first hole H1, a second hole H2 and a third hole H3 corresponding to the first opening 435, the second opening 438 and the third opening 439, respectively.

Referring to FIGS. 8, 10A and 10B, a second mask 440 is formed on the opaque organic layer 181 having the first to third holes H1, H2 and H3, respectively. A first opening 445, a second opening 448 and a third opening 449 are formed through the second mask 440.

The passivation layer 140 is etched using the second mask 440 to form a first contact hole 185 exposing a drain electrode 175, a second contact hole 188 exposing an end portion 128 of a gate line 121 and a third contact hole 189 exposing an end portion 179 of a data line 172.

Figure 11A:
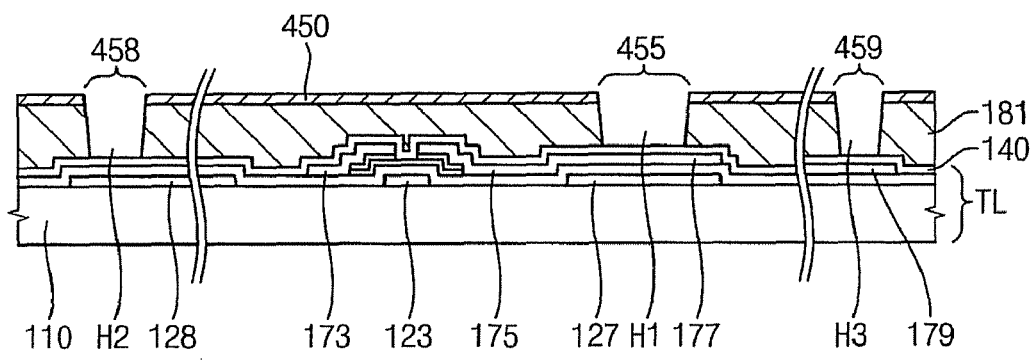
FIGS. 11A and 11B are cross-sectional views illustrating a process according to still another exemplary embodiment for manufacturing the display substrate according to the exemplary embodiment of the present invention illustrated in FIG. 8.
Figure 11B:
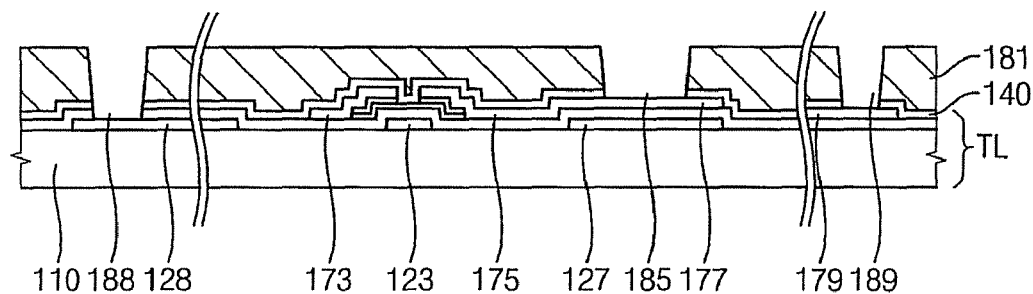

FIGS. 11A and 11B are cross-sectional views illustrating a process according to still another exemplary embodiment for manufacturing the display substrate according to the exemplary embodiment of the present invention illustrated in FIG. 8.

Referring to FIGS. 8 and 11A, a TFT layer TL including a TFT is formed on an insulation layer 110. A passivation layer 140 and an opaque organic layer 181 are sequentially formed on the TFT layer TL.

A first mask 450 is formed on the opaque organic layer 181. A first opening 455, a second opening 458 and a third opening 459 are formed through the first mask 450.

The opaque organic layer 181 is etched using the first mask 450 to form a first hole H1, a second hole H2 and a third hole H3 corresponding to the first opening 455, the second opening 458 and the third opening 459, respectively.

Referring to FIGS. 8, 11A and 1B, the passivation layer 140 is etched using the opaque organic layer 181 having the first to third holes H1, H2 and H3 to form a first contact hole 185 exposing a drain electrode 175, a second contact hole 188 exposing an end portion 128 of a gate line 121 and a third contact hole 189 exposing an end portion 179 of a data line 172.

In this exemplary embodiment of the present invention, the opaque organic layer 181 is used as a mask to reduce the number of masks for manufacturing a display substrate.

According to the exemplary embodiments of the present invention described above, an opaque pixel electrode and/or an opaque protection layer cover a TFT of an electrophoretic display to improve a brightness and/or contrast ratio of an electrophoretic display device and to effectively reduce or eliminate a leakage current of the TFT caused by light leaking incident to a channel of the TFT.

More specifically, the opaque pixel electrode including a reflective electrode layer and an absorption electrode layer may cover a channel of the TFT to block light incident into the TFT from a first and an opposite second side of the electrophoretic display. Further, the opaque protection layer covers the TFT to prevent light incident onto the TFT from being reflected and/or scattered. Thus, light leakage may be reduced or effectively prevented and a brightness and/or contrast ratio is thereby increased, while a leakage current may be effectively prevented and/or reduced in exemplary embodiments of the present invention.

The present invention should not be construed as being limited to the exemplary embodiments set forth herein. Rather, these exemplary embodiments are provided so that this disclosure will be thorough and complete and will fully convey the concept of the present invention to those skilled in the art.

Although exemplary embodiments of the present invention have been particularly shown and described herein, it will be understood that the present invention is not limited to the exemplary embodiments described herein and that various changes in form and details may be made by those of ordinary skill in the art without departing from the spirit and scope of the present invention as defined by the following claims.

What is claimed is:

1. A display panel comprising:
   a first substrate;
   a second substrate facing the first substrate; and
   a plurality of capsules, each of the capsules having particles having different colors, the first substrate comprising:
      an insulation substrate;
      a gate line formed on the insulation substrate;
      a data line formed on the insulation substrate and crossing the gate line;
      a switching element formed on the insulation substrate and electrically connected to the gate line and the data line; and
      a pixel electrode formed on the insulation substrate and electrically connected to the switching element, wherein the pixel electrode comprises:
      a reflective electrode layer which reflects light; and
      an absorption electrode layer which absorbs light, wherein the absorption electrode layer is formed on the reflective electrode layer.

2. The display panel of claim 1, wherein the reflective electrode layer comprises at least one selected from the group consisting of chromium and molybdenum.

3. The display panel of claim 1, wherein an optical density of the absorption electrode layer is greater than or equal to about 3.6.

4. The display panel of claim 3, wherein the absorption electrode layer comprises at least one selected from the group consisting of chromium oxide and molybdenum oxide.

5. The display panel of claim 1, wherein the switching element comprises a channel having a semiconductor layer.

6. The display panel of claim 5, wherein the pixel electrode overlaps the channel of the switching element.

7. The display panel of claim 6, wherein the reflective electrode layer is connected to the switching element and the absorption electrode layer is formed on the reflective electrode layer.

8. The display panel of claim 1, further comprising a protection layer formed on the switching element.

9. The display panel of claim 8, wherein the protection layer comprises an opaque organic insulation material.

10. The display panel of claim 9, wherein the pixel electrode further comprises a transparent electrode layer.

11. The display panel of claim 10, wherein the transparent electrode layer is connected to the switching element, the reflective electrode layer is formed on the transparent electrode layer.

12. A display panel comprising:
a first substrate;
a second substrate facing the first substrate; and
a plurality of capsules, each of the capsules having particles having different colors, the first substrate comprising:
an insulation substrate;
a gate line formed on the insulation substrate;
a data line formed on the insulation substrate and crossing the gate line;
a switching element formed on the insulation substrate and electrically connected to the gate line and the data line;
an organic layer covering the switching element and comprising an opaque material; and
a pixel electrode formed on the organic layer, wherein the pixel electrode is electrically connected to the switching element through a contact hole formed through the organic layer,
wherein the pixel electrode comprises a reflective electrode layer which reflects light and an absorption electrode layer which absorbs light, and the absorption electrode layer is formed on the reflective electrode layer.

13. The display panel of claim 12, wherein the organic layer is black.

14. The display panel of claim 12, wherein the organic layer is white.

15. The display panel of claim 12, further comprising a passivation layer formed between the switching element and the organic layer.

* * * * *